Jan. 13, 1931. L. LESOT 1,788,798
ATTRACTION
Filed Jan. 17, 1929 2 Sheets-Sheet 1
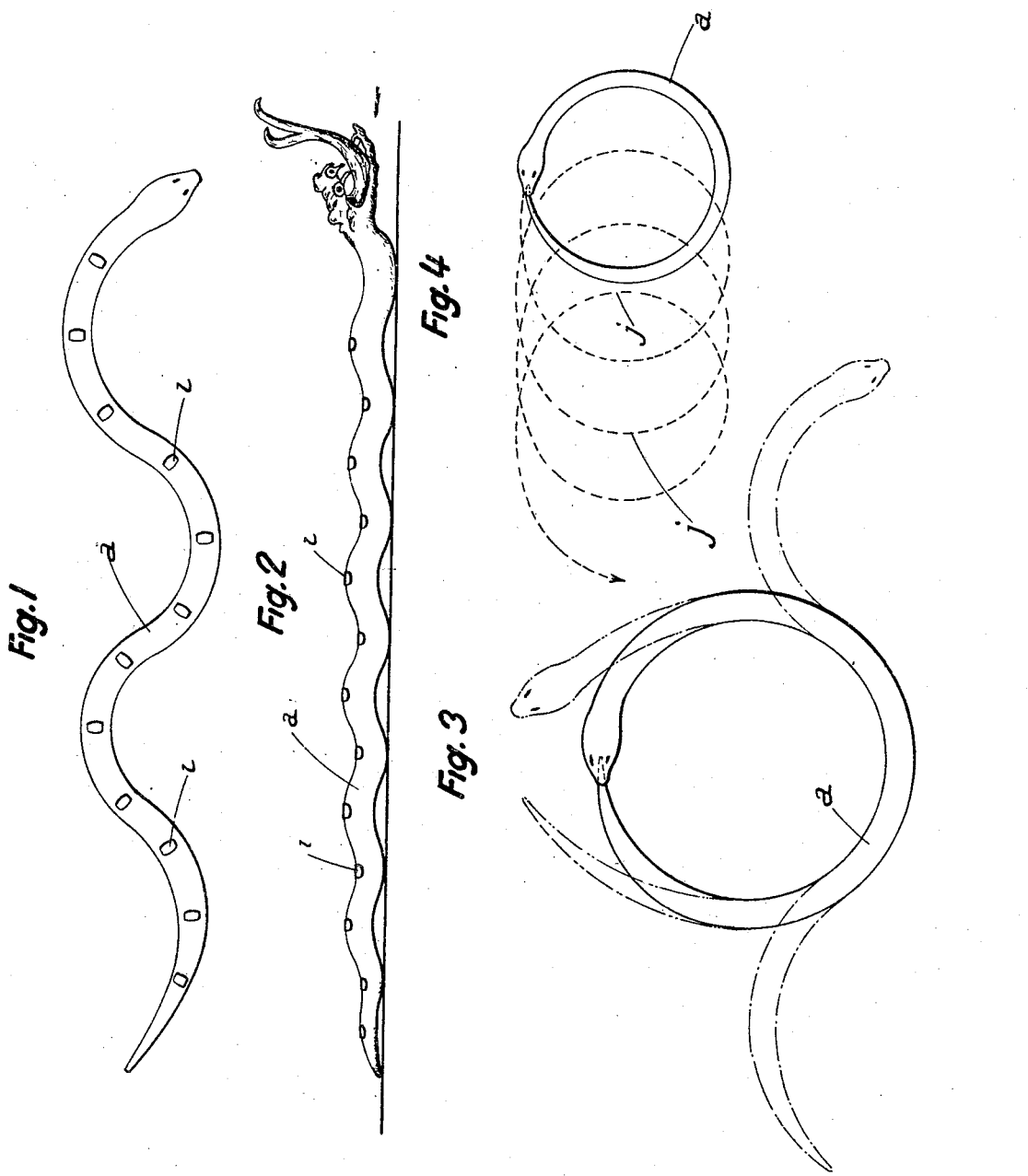
Inventor
Louis Lesot Jan. 13, 1931.  L. LESOT  1,788,798
ATTRACTION
Filed Jan. 17, 1929  2 Sheets-Sheet 2
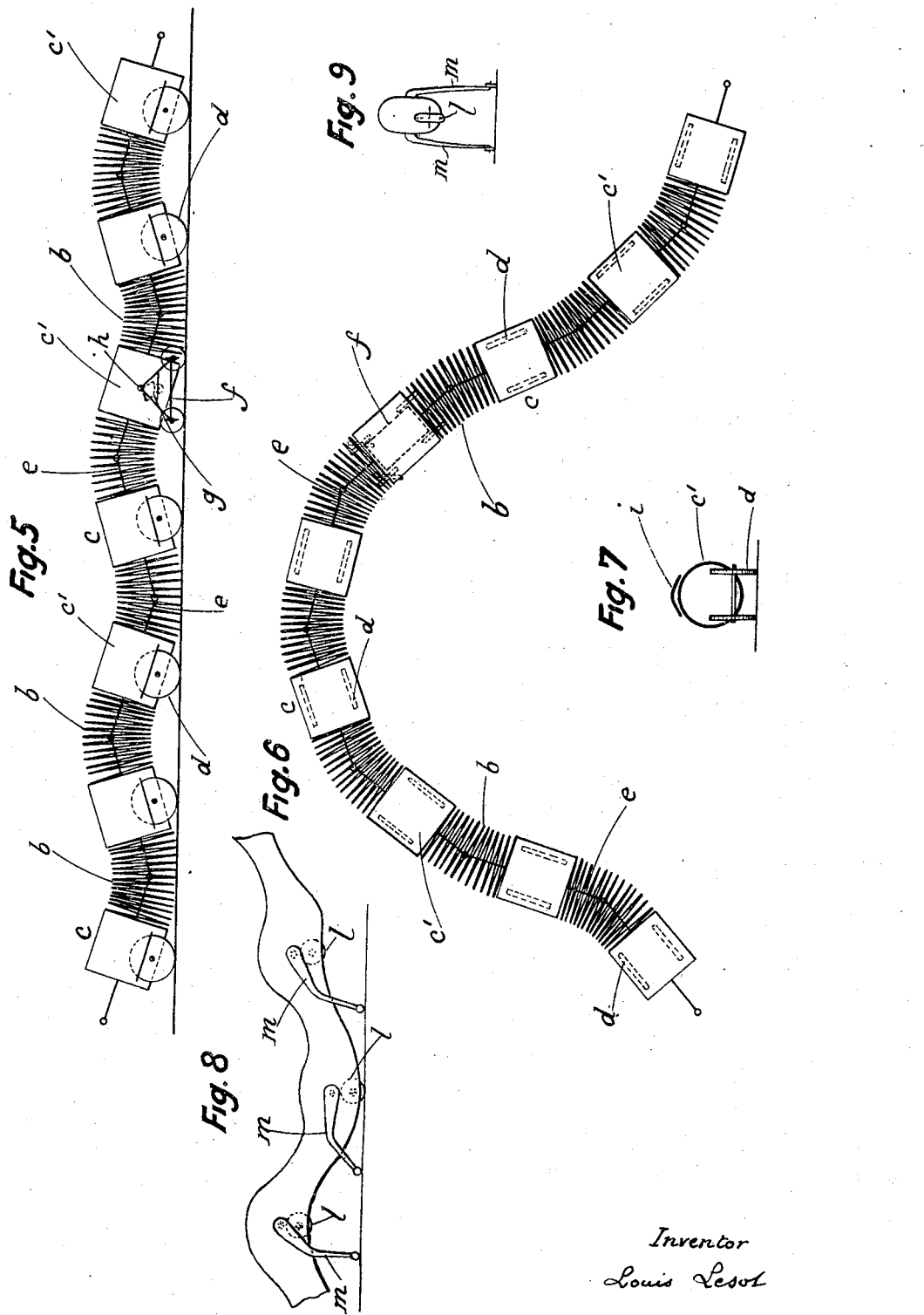
Inventor
Louis Lesot Patented Jan. 13, 1931

1,788,798

UNITED STATES PATENT OFFICE

LOUIS LESOT, OF BOULOGNE-SUR-SEINE, FRANCE

ATTRACTION

Application filed January 17, 1929. Serial No. 333,063.

The present invention has for its object an attraction of a quite new style, for festivals, entertainments, exhibitions, attraction parks, circus, music-halls and the like, characterized by the fact that the apparatus which constitutes the same, and in which all parts are movable, is freely moving upon the ground without any connection with a stationary point such as is the case in all run-abouts and other attractions as heretofore known, and is distorted in all directions thereby causing more or less important displacements which are more or less sudden for the persons occupying said apparatus.

Said attraction is preferably made in the form of an animal with a long body, such as a snake, a dragon, a diplodocus, a lizard and the like, so as to allow the amateurs to seat on the back of the animal, either on saddles or on seats which are disposed in rows or otherwise and in any number.

Said attraction which shows special and quite characteristic properties which cannot be found in any of the attractions as known at present, constitutes a new industrial product which is capable of being made by various mechanical means.

For the purpose of setting out the characteristic features of the invention, the same will be hereinafter described in a form of construction given by way of example, without any limitation, with reference to the accompanying drawings in which:

Fig. 1 shows in plan view the invention carried out in the form of a snake.

Fig. 2 is a view in elevation.

Figs. 3 and 4 are plan views showing the several effects capable of being obtained.

Fig. 5 shows in elevation a diagram of a mechanical embodiment of the apparatus.

Fig. 6 is a plan view and

Fig. 7 is a cross section thereof.

Figs. 8 and 9 relate to a modified form of the invention.

As hereinbefore described, the attraction which forms the object of the invention is preferably carried out in the form of an animal having a long shape such as $a$. Said body comprises a certain number of members, the rigid ones being mounted directly or indirectly on wheels and the others, which are flexible and distortable, being interposed between the rigid ones and connecting the same together. The result is that the rigid parts which roll upon the ground are capable of taking the one relatively to the other the most various positions and that the whole constitutes an articulated system capable of assuming any desired form. The whole is covered with a wrapper or cover made of a fabric, leather, skin or other substances capable of giving to the animal the required appearance.

In the example shown in Figs. 5, 6 and 7 of the accompanying drawing, the flexible and distortable parts are constituted by metal or wood coils or windings $b$ connecting two adjoining elements $c$—$c$, which are each formed of a circular drum or barrel $c^1$, either of metal, or of wood; with full or open wall, which drum can be directly provided with wheels or be mounted on a rolling frame. The various rigid elements are connected together by means of couplings $e$ and in such conditions that they can incline themselves the one relatively to the other, both in the vertical and in the horizontal directions. For example, according to the indications given in Figs. 5 to 7, the rigid members $c$ are mounted on two wheels $d$—$d$, this allowing the same to be inclined at will in the vertical direction. These movements of inclination in the vertical direction can be controlled, in their whole, for instance by an organ mounted upon a four-wheel frame $f$ interposed in this whole device and to which rocking motions about its suspension shaft $h$ can be imparted through mechanical parts, gear wheels or others such as $g$.

However, said movements of inclination according to sinuosities in the vertical direction can be produced by any other mechanical means such as those which will be easily conceived and which will act either upon the whole of the parts or individualy upon each one of them.

The rolling parts of the apparatus are hauled by means of one or several motors or are provided with electrical motive axles. The horizontal sinuosities of the whole are then obtained through the variations of the direction, or steering, the couplings connecting the elements together being for this purpose provided with any suitable devices.

The rolling parts or elements could be constituted by carriages provided with steering wheels coupled or not and controlled by the coupling device or in any other manner capable of facilitating the steering and the formation of sinuosities in the course. The flexible parts could be constituted by pneumatic tires, air chambers or the like. In this case the partial inflation and deflation could be alternatively determined, and this would evidently imitate the breathing motions of the animal as represented and could be utilized for causing the persons installed upon the animal to undergo a rising and lowering movement.

The apparatus constituted by the rolling parts and the flexible and distortable parts connecting them together form a continuous articulated frame capable of moving and of being distorted in all directions, which is covered with a painted sheet or a cover made of any material giving to the whole the desired appearance, for example that of a snake or of a big animal of long shape. On the whole can be disposed saddles $i$ for example, or seats, or any other supports on which the passengers can ride, seat or occupy any position capable of increasing the entertainment or attraction.

The operation of the apparatus is controlled by one or several men placed on one or several of the parts of the device and concealed, who control the mechanical or electrical transmission gears which are provided for moving and steering the apparatus, the said steering being possibly facilitated by marks placed on the ground.

It will for example be possible, in case the apparatus is made in the form of a snake or any similar form, to have the tail of the animal engaged in its mouth (Fig. 3) and to impart to the whole circular device which is thus formed a rapid circular motion. At a given moment it will be possible to cause the two ends of the animal to be separated the one from the other and, in virtue of the centrifugal force, the said ends will be projected outwardly like a lash (mixed lines). In order to allow this exercise to take place, the carrying wheels of the rolling carriages must necessarily be mounted in steerable cheeks.

When a rapid circular motion will be imparted to the animal forming a round, as just described, the latter being unequally loaded over the different parts of its length, the same will describe orbits $j$ as shown in Fig. 4.

It must be understood that the embodiments or forms of construction of the apparatus are not limited to those which have been described, namely as regards the rolling devices and the mechanical means which are employed for causing the distortions of the system.

For example, according to the diagrammatic indications of Figs. 8 and 9, each one of the rolling elements could comprise but one wheel $l$, which will be a driving one disposed in the axial plan of the apparatus so that it will project but slightly from under the belly of the animal which is reproduced. The vertical distortions of the apparatus could be obtained by means of external levers $m$—$m$ which would be utilized for acting as paws and which would be mechanically operated from the interior of the elements to which they would be articulated. The amplitude of the angular displacements of the levers $m$—$m$ of a same element could be different so as to determine, at the same time an ascending and a descending motion, a lateral rocking or tilting motion. The apparatus would of course be dressed so as to represent a suitable animal or monster. The levers or paws could also be arranged so as to secure the translation by means of driving or motor wheels mounted at the extremities thereof and driven by small motors located either at the base of said levers or paws or in any other place.

All other means could also be employed so as to secure the displacements in all directions and the distortions in all directions of the whole of the articulated and distortable system, according to the invention.

The movements which have just been described could also be combined with any subsidiary devices or appliances capable of increasing or enhancing the attraction of the game (cut off wheels, excentered wheels and the like).

I claim:

1. A new attraction in the form of a large serpent or similar large animal having no connection with a fixed point, comprising in combination a plurality of rigid sections, resilient sections adapted to yield in any direction arranged one between every two said rigid sections, a cover enclosing and concealing said rigid and said resilient sections, means arranged on one of said rigid sections for propelling the whole device, and seating accommodation on each of said rigid sections.

2. A new attraction such as under claim 1 in which the rigid sections are constituted by rolling carriages.

3. An attraction as under claim 1, in which the rigid sections are provided with paws or articulated shoes.

In testimony whereof I affix my signature.

LOUIS LESOT.